(12) United States Patent
Lee et al.

(10) Patent No.: US 6,319,760 B1
(45) Date of Patent: Nov. 20, 2001

(54) MANUFACTURING METHOD OF LIQUID CRYSTAL DISPLAY HAVING HIGH APERTURE RATIO AND HIGH TRANSMITTANCE

(75) Inventors: Seung Hee Lee, Kyoungki-do; Seok Lyul Lee; Kyu Chang Park, both of Seoul, all of (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/428,274

(22) Filed: Oct. 27, 1999

(30) Foreign Application Priority Data

Oct. 28, 1998 (KR) .................................................. 98-45454

(51) Int. Cl.[7] .............................. H01L 21/00; G02F 1/136
(52) U.S. Cl. ........................... 438/161; 438/30; 438/155; 349/42
(58) Field of Search ............................. 438/30, 155, 159, 438/160, 161; 349/38, 42, 141

(56) References Cited

U.S. PATENT DOCUMENTS

| 5,621,556 |   | 4/1997 | Fulks et al. . | |
|---|---|---|---|---|
| 5,811,846 | * | 9/1998 | Miura et al. | 257/291 |
| 5,834,344 | * | 11/1998 | Cheng | 438/158 |
| 5,859,677 |   | 1/1999 | Watanabe et al. . | |
| 5,879,973 | * | 3/1999 | Yanai et al. | 438/161 |
| 5,907,380 |   | 5/1999 | Lien . | |
| 5,965,916 | * | 10/1999 | Chen | 257/347 |

FOREIGN PATENT DOCUMENTS

| 1011029 | 1/1998 | (JP) . |
|---|---|---|
| 10105084 | 4/1998 | (JP) . |
| 10269020 | 10/1998 | (JP) . |

* cited by examiner

Primary Examiner—John F. Niebling
Assistant Examiner—Viktor Simkovic
(74) Attorney, Agent, or Firm—Selitto, Behr & Kim

(57) ABSTRACT

The present invention is directed to provide a manufacturing method of a liquid crystal display having high transmittance and high aperture ratio, wherein the method is capable of decreasing process time and cost by reducing numbers of photolithography process steps. The manufacturing method of the liquid crystal display according to comprises the steps of: providing a transparent insulating substrate having a displaying area and a non-displaying area; forming a light shielding pattern and a common signal line, with an opaque metal layer on the non-displaying area of the transparent insulating substrate; forming a counter electrode with a transparent metal layer on the displaying area of the transparent insulating substrate; depositing an insulating layer over the transparent insulating substrate so as to cover the light shielding pattern and the common signal line, and the counter electrode; forming source and drain electrodes to be overlapped with the light shielding pattern respectively on the insulating layer portions of both sides of the light shielding pattern and a data bus line connected to the source electrode; forming a pixel electrode with a transparent metal layer on the insulating layer portion of the displaying area; forming a channel layer on the light shielding pattern and on the source and drain electrode portion overlapped with the light shielding pattern; and forming a gate bus line having a gate insulating layer on the channel layer.

9 Claims, 3 Drawing Sheets

MANUFACTURING METHOD OF LIQUID CRYSTAL DISPLAY HAVING HIGH APERTURE RATIO AND HIGH TRANSMITTANCE

BACKGROUND OF THE INVENTION

1. Field of the Invention

The present invention generally relates to manufacturing method of a liquid crystal display having high aperture ratio and high transmittance, more particularly to manufacturing method of a liquid crystal display having high aperture ratio and high transmittance, wherein the method is capable of reducing numbers of photolithography process steps.

2. Description of the Related Art

Due to rapid developments in active matrix liquid crystal display, the active matrix liquid crystal display have been used in various TV and monitors for portable computers. The active matrix liquid crystal display has an advantage of excellent response characteristic and is appropriate for high number of pixels, therefore, high quality and large size of display devices comparable to the cathode ray tube(CRT) can be realized.

As an operation mode, twisted nematic(TN) mode and super twist nematic(STN) have been applied to the active matrix liquid crystal display. Herein, the TN and the STN are modes that an electric field is applied vertical to substrate plane. Although, the liquid crystal displays of the TN and the STN modes have been used practically, however there is a disadvantage of narrow viewing angle. According to this disadvantage, an In-plane switching(IPS) mode liquid crystal display is suggested to overcome the disadvantage of narrow viewing angle in the TN and STN mode liquid crystal display.

Although not shown in the drawings, said IPS mode liquid crystal display has a structure that a pixel electrode and a counter electrode, both for driving liquid crystal molecules, are provided on a same substrate in parallel and an electric field that is in-plane to substrate plane is applied. The IPS mode liquid crystal display has the advantage of viewing angle that is wider than the conventional TN or STN mode liquid crystal display. However, since the pixel and the counter electrodes are made of opaque metal layers, there is a limitation of developments in aperture ratio and transmittance.

Accordingly, in order to overcome the limitation of development in aperture ratio and transmittance of the IPS mode liquid crystal display, a fringe field switching(FFS) mode liquid crystal display is suggested. In the FFS mode liquid crystal display, pixel and counter electrodes are made of a transparent metal layer, for example ITO metal layer thereby providing an improved aperture ratio compared to said IPS mode liquid crystal display. Further, a distance between the counter and the pixel electrodes is narrower than that between upper and lower substrates. For this reason, there is formed a fringe field on upper portions of the counter and the pixel electrodes and then liquid crystal molecules disposed on said upper portions are all driven thereby improving the transmittance of the IPS mode liquid crystal display.

FIG. 1 is a cross-sectional view showing a lower substrate of a conventional FFS mode liquid crystal display and method of manufacturing the same is as follows. A transparent insulating substrate, for example a glass substrate 1 is provided. A transparent metal layer likewise an ITO metal layer and an opaque metal layer having a low resistance likewise MoW, are deposited on the glass substrate 1 in turn. A gate bus line 2 and a common signal line(not shown) are formed by patterning the opaque metal layer. The exposed ITO layer portion is patterned in the form of a rectangular plate or a comb having a plurality of branches, thereby forming a counter electrode 3. The counter electrode 3 is formed to be contacted with the common signal line(not shown). The counter electrode 3 can be formed earlier than the gate bus line 2. A gate insulating layer 4 is formed over the glass substrate 1 including the gate bus line 2 and counter electrode 3.

An undoped amorphous silicon layer and a silicon nitride layer is deposited on the gate insulating layer 4 in turn. An etch stopper 6 is formed by patterning the silicon nitride layer. A doped amorphous silicon layer is deposited on the undoped amorphous silicon layer including the etch stopper 6, and an ohmic contact layer 7 and a channel layer 5 are formed by patterning the doped amorphous silicon layer and the undoped amorphous silicon layer. A pad opening process is performed so as to expose pads(not shown) provided at edges of the glass substrate 1.

An ITO metal layer and a low resistance metal layer are deposited on a resultant in turn. A data bus line(not shown) including source electrode 8a and a drain electrode 8b is formed by patterning the opaque metal layer, so that a thin film transistor 10 is formed. A pixel electrode having selected number of branches is formed by patterning the exposed ITO metal layer portion. The pixel electrode 9 is formed to be contacted with the source electrode 8a. A passivation layer 20 is coated over the resultant, and then the passivation layer 20 is patterned so that the passivation layer 20 covers the portion of thin film transistor 10. Consequently, the lower substrate of the FFS mode liquid crystal display having high aperture ratio and high transmittance is accomplished.

However, the lower substrate of the liquid crystal display having high aperture ratio and high transmittance requires at least eight times of patterning processes, i.e. photolithography process e.g. steps of forming a gate bus line; forming a counter electrode; forming an etch stopper; forming a channel layer and an ohmic contact layer; opening a pad; forming a data bus line; forming a pixel electrode; and forming a passivation layer. Furthermore, since the photolithography process itself includes a resist-coating step, an exposing step, a developing step, an etching step and a resist-removing step, it takes substantially many hours to manufacture the liquid crystal display having high aperture ratio and high transmittance. Therefore, the productivity is very low as well as the yield of production, and an exposing ask is required at each exposing step thereby increasing manufacturing cost.

SUMMARY OF THE INVENTION

Accordingly, the present invention is directed to provide a manufacturing method of a liquid crystal display having high transmittance and high aperture ratio, wherein the method is capable of decreasing process time and cost by reducing numbers of photolithography process steps.

In order to accomplish the foregoing object of the present invention, the manufacturing method of a liquid crystal display comprises the steps of: providing a transparent insulating substrate having a displaying area and a non-displaying area; forming a light shielding pattern and a common signal line, with an opaque metal layer on the non-displaying area of the transparent insulating substrate; forming a counter electrode with a transparent metal layer on the displaying area of the transparent insulating substrate;

depositing an insulating layer over the transparent insulating substrate so as to cover the light shielding pattern and the common signal line, and the counter electrode; forming source and drain electrodes to be overlapped with the light shielding pattern respectively on the insulating layer portions of both sides of the light shielding pattern and a data bus line connected to the source electrode; forming a pixel electrode with a transparent metal layer on the insulating layer portion of the displaying area; forming a channel layer on the light shielding pattern and on the source and drain electrode portion overlapped with the light shielding pattern; and forming a gate bus line having a gate insulating layer on the channel layer.

BRIEF DESCRIPTION OF THE DRAWINGS

Object and spirit of this invention will not be more understood by referring attached drawings.

FIGS. 2A to 2E are cross-sectional views showing manufacturing steps of a liquid crystal display having high transmittance and high aperture ratio according to the present invention.

DETAILED DESCRIPTION OF THE INVENTION

Figure 1:
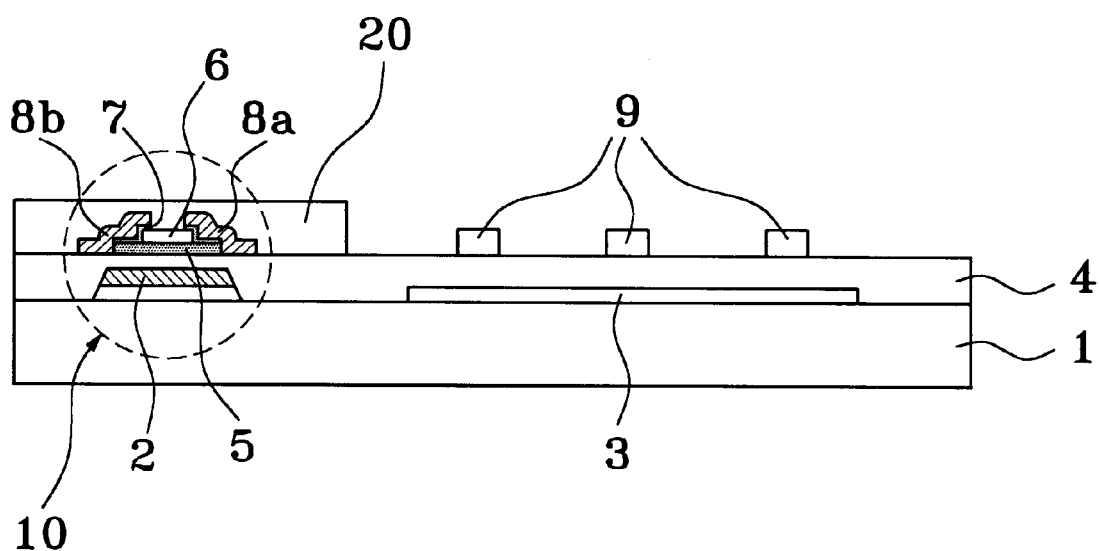
FIG. 1 is a cross-sectional view showing a lower substrate of a conventional liquid crystal display having high transmittance and high aperture ratio.
Figure 2A:
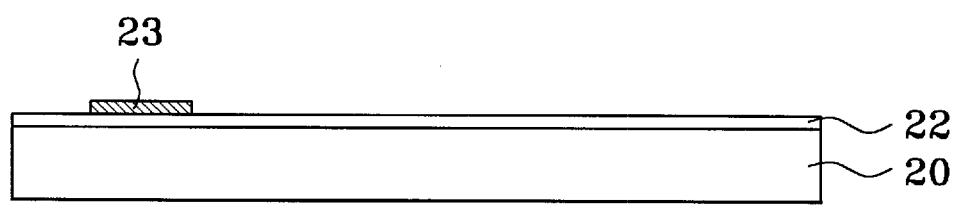

Referring to FIG. 2A, a transparent insulating substrate, having both displaying and non-displaying areas, for example a glass substrate 21 is provided. A transparent metal layer 22 such as an ITO metal layer, and an opaque low resistance metal layer such as MoW metal layer are deposited on the glass substrate 21 in turn. And then, a light shielding pattern 23 and a common signal line(not shown) are formed on the non-displaying area of the glass substrate 21 by patterning the opaque metal layer according to a first photolithography process.

Figure 2B:
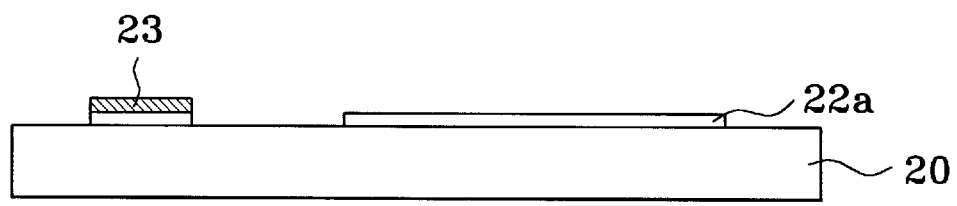

Referring to FIG. 2B, a counter electrode 22a is formed on the displaying area of the glass substrate 21 by patterning an exposed portion of the transparent metal layer according to a second photolithography process. The counter electrode 22a has the form of a rectangular plate or a comb having a plurality of branches. In the embodiment of the present invention, the counter electrode 22a has the shape of rectangular plate. Further, the counter electrode 22a is formed to be contacted with the common signal line.

As another embodiment of the present invention, a revered processing order of said light shielding pattern 23, said common signal line and said counter electrode 22a is also available. That is, a transparent metal layer is deposited on a glass substrate, a counter electrode is formed by patterning the transparent metal layer and afterward an opaque low resistance metal layer is formed over the glass substrate having the counter electrode and finally a light shielding pattern and a common signal line are formed by patterning the opaque metal layer.

In further embodiment of the present invention, change of manufacturing method of the light shielding pattern 23, the common signal line and the counter electrode 22a, is also available. In other words, an opaque low resistance metal is deposited on a glass substrate, and then a light shielding pattern and a common signal line are formed by patterning the opaque low resistance metal layer, and afterward a transparent metal layer is formed over the glass substrate having the light shielding pattern and the common signal line, and finally a counter electrode is formed by patterning the transparent metal layer.

Figure 2C:
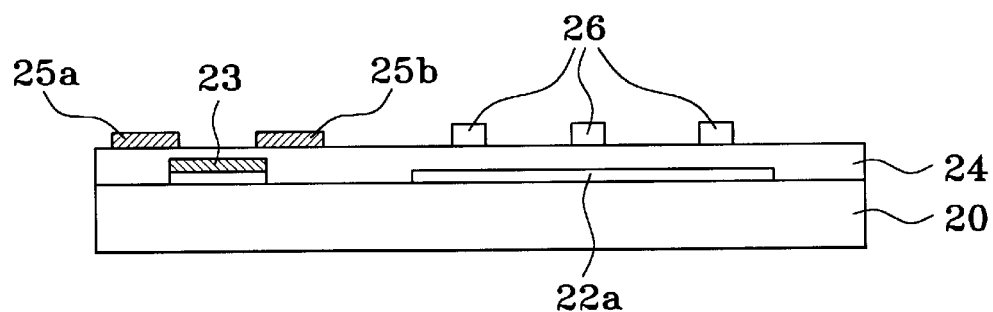

Referring to FIG. 2C, an insulating layer 24 is deposited on the resultant. An opaque metal layer having low resistance is deposited on the insulating layer 24 and then a data bus line(not shown) including source and drain electrodes 25a,25b are formed by patterning the opaque metal layer according to a third photolithography process. The source electrode 25a and the drain electrode 25b are formed such that some portions thereof are arranged to be overlapped with each corner of the light shield pattern 23. Further, the data bus line is contacted with the source electrode 25a and is extended in a selected direction. A transparent metal layer such as ITO metal layer is deposited on the resultant, and a pixel electrode 26 is formed on the insulating layer portion over the counter electrode 22a by patterning the ITO metal layer according to a fourth photolithography process. The pixel electrode 26 has the shape of a comb having a selected number of branches. Herein, if the counter electrode 22a has the shape of a comb having a plurality of branches, each branch of the pixel electrode 26 is disposed between the branches of the counter electrodes 26.

It is also available to reverse the order of the data bus line including the source and the drain electrodes, and the pixel electrode. Namely, pixel electrode can be formed previous to a data bus line including source and drain electrodes.

Although not shown in the drawings, the data bus line including the source and the drain electrodes, and the pixel electrode can be formed as follows. First, a transparent metal layer and an opaque metal layer are deposited in turn. Then, the data bus line including the source and the drain electrodes is formed by patterning the opaque metal layer, and afterward, a pixel electrode is formed by patterning the exposed transparent metal layer portion.

Figure 2D:
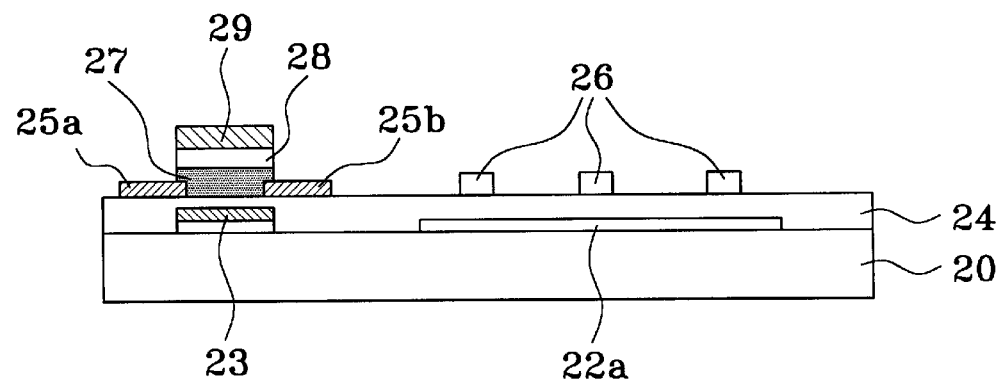

Referring to FIG. 2D, an undoped amorphous silicon layer is deposited on the resultant, and then a channel layer 27 is formed according to a backside exposing process using the light shielding pattern 23 as a mask and an etching process. More particularly, a resist layer(not shown) is coated on the undoped amorphous silicon layer and a resist pattern(not shown) is formed according to the backside exposing process using the light shielding pattern 23 as a mask and according to a known developing process. Afterward, the channel layer 27 is formed by etching the undoped amorphous silicon layer using the resist pattern as a mask. Herein, during forming the channel layer 27, a pad opening process is performed simultaneously. Accordingly, no additional pad opening step is required.

Continuously, a gate insulating layer 28 and a low resistance metal layer such as a MoW metal layer are deposited in turn over the insulating layer 24 in which the channel layer 27 is formed. A gate bus line 29 having the gate insulating layer 28 is formed by patterning the low resistance metal layer and the gate insulating layer 28 according to a fifth photolithography process. As a result, a stagger type thin film transistor 30 and a lower substrate of a liquid crystal display having high aperture ratio and high transmittance are accomplished.

In the embodiment of the present invention, a step of depositing a passivation layer for protecting the thin film transistor and a step of patterning the passivation layer are not required. Since a channel layer of a conventional inverted stagger type thin film transistor is exposed, a passivation layer is necessary to prevent exposing of the channel layer. However, since the thin film transistor according to the present invention is the stagger type that does not expose its channel layer. No passivation layer is required.

According to the present invention, a lower substrate of a liquid crystal display having high aperture ratio and high transmittance is manufactured by performing: a first photolithography process for forming a light shielding pattern and a common signal line; a second photolithography process for forming a counter electrode; a third photolithography process for forming a data bus line including source and drain electrodes; a fourth photolithography process for forming a pixel electrode; and a fifth photolithography process for forming a gate bus line. Accordingly, the lower substrate is manufactured by the above method, and the method is capable of decreasing process time and cost by reducing numbers of photolithography process steps. Manufacturing steps of the present invention are more reduced compared to conventional methods thereby improving productivity and production yield. Moreover, this method reduces manufacturing cost due to a decrease of masks.

While the present invention has been described with reference to certain preferred embodiments, various other modifications will be apparent to and can be readily made by those skilled in the art without departing from the scope and spirit of the present invention.

What is claimed is:

1. A method for manufacturing a liquid crystal display having a high transmittance and a high aperture ratio, comprising the steps of:
   providing a transparent insulating substrate having a displaying area and a non-displaying area;
   forming a light shielding pattern and a common signal line on the non-displaying area of the transparent insulating substrate with a first opaque metal layer;
   forming a counter electrode on the displaying area of the transparent insulating substrate with a first transparent metal layer;
   depositing an insulating layer over the transparent insulating substrate so as to cover the light shielding pattern and the common signal line, and the counter electrode;
   forming source and drain electrodes and a data bus line, which is connected to the source electrode, on the insulating layer with a second opaque metal layer, each of the source and drain electrodes having a portion overlapped with the light shielding pattern;
   forming a pixel electrode on the insulating layer over the displaying area of the transparent insulating substrate with a second transparent metal layer;
   forming a channel layer over the light shielding pattern and on the portions of the source and drain electrodes overlapped with the light shielding pattern; and
   forming a gate bus line having a gate insulating layer on the channel layer, whereby the liquid crystal display is made with a substantially reduced number of photolithography steps, improving productivity and production yield.

2. The method of claim 1, wherein the step of forming the light shielding pattern and the common signal line and the step of forming the counter electrode comprise the steps of:
   depositing the first transparent metal layer and the first opaque metal layer in turn on the transparent insulating substrate;
   forming the light shielding pattern and the common signal line on the non-displaying area of the transparent insulating substrate by patterning the first opaque metal layer; and
   forming the counter electrode on the displaying area of the transparent insulating substrate by patterning an exposed portion of the first transparent metal layer.

3. The method of claim 1, wherein the step of forming the light shielding pattern and the common signal line and the step of forming the counter electrode comprise the steps of:
   depositing the first opaque metal layer on the transparent insulating substrate;
   forming the light shielding pattern and the common signal line on the non-displaying area of the transparent insulating layer by patterning the first opaque metal layer;
   depositing the first transparent metal layer over the transparent insulating substrate in which the light shielding pattern and the common signal line are formed; and
   forming the counter electrode on the displaying area of the transparent insulating substrate by patterning the first transparent metal layer.

4. The method of claim 1, wherein the step of forming the light shielding pattern and the common signal line and the step of forming the counter electrode comprise the steps of:
   depositing the first transparent metal layer on the transparent insulating substrate;
   forming the counter electrode on the displaying area of the transparent insulating substrate by patterning the first transparent metal layer;
   depositing the first opaque metal layer over the transparent insulating substrate in which the counter electrode is formed; and
   forming the light shielding pattern and the common signal line on the non-displaying area of the transparent insulating substrate by patterning the first opaque metal layer.

5. The method of claim 1, wherein the counter electrode has the shape of a rectangular plate or the shape of a comb having a selected number of branches.

6. The method of claim 1, wherein the step of forming the source and drain electrodes and the data bus line and the step of forming the pixel electrode comprise the steps of:
   depositing the second transparent metal layer and the second opaque metal layer successively on the insulating layer;
   forming the source and drain electrodes disposed on the insulating layer over the light shielding pattern, and the data bus line connected with the source electrode and extended in a selected direction, by patterning the second opaque metal layer; and
   forming the pixel electrode on the insulating layer over the counter electrode by patterning the second transparent metal layer.

7. The method of claim 1, wherein the step of forming the source electrode, the drain electrode and the data bus line and the step of forming the pixel electrode comprise the steps of:
   depositing the second opaque metal layer on the insulating layer;
   forming the source and drain electrodes disposed on the insulating layer over the light shielding pattern, and the data bus line connected with the source electrode and extended in a selected direction, by patterning the second opaque metal layer;
   depositing the second transparent metal layer on the insulating layer in which the source and drain electrodes and the data bus line are formed; and
   forming the pixel electrode on the insulating layer over the counter electrode by patterning the second transparent metal layer.

8. The method of claim 1, wherein the step of forming the source electrode, the drain electrode and the data bus line and the step of forming the pixel electrode comprise the steps of:

depositing the second transparent metal layer on the insulating layer;

forming the pixel electrode on the insulating layer over the counter electrode by patterning the second transparent metal layer;

depositing the second opaque metal layer over the insulating layer in which the pixel electrode is formed; and forming the source and drain electrodes disposed on the insulating layer over the light shielding pattern, and the data bus line connected with the source electrode and extended in a selected direction, by patterning the second opaque metal layer.

9. The method of claim 1, wherein the step of forming the channel layer comprises the steps of:

depositing an undoped amorphous silicon layer over the insulating layer in which the source electrode, the drain electrode, the data bus line and the pixel electrode are formed;

coating a resist layer over the undoped amorphous silicon layer;

backside-etching the resist layer by using the light shielding pattern as an exposing mask, and developing the same so that a resist pattern is formed on a portion of the undoped amorphous silicon layer over the light shielding pattern; and etching the undoped amorphous silicon layer by using the resist pattern as an etching mask so that the channel layer is formed.

* * * * *